United States Patent Office 3,277,026
Patented Oct. 4, 1966

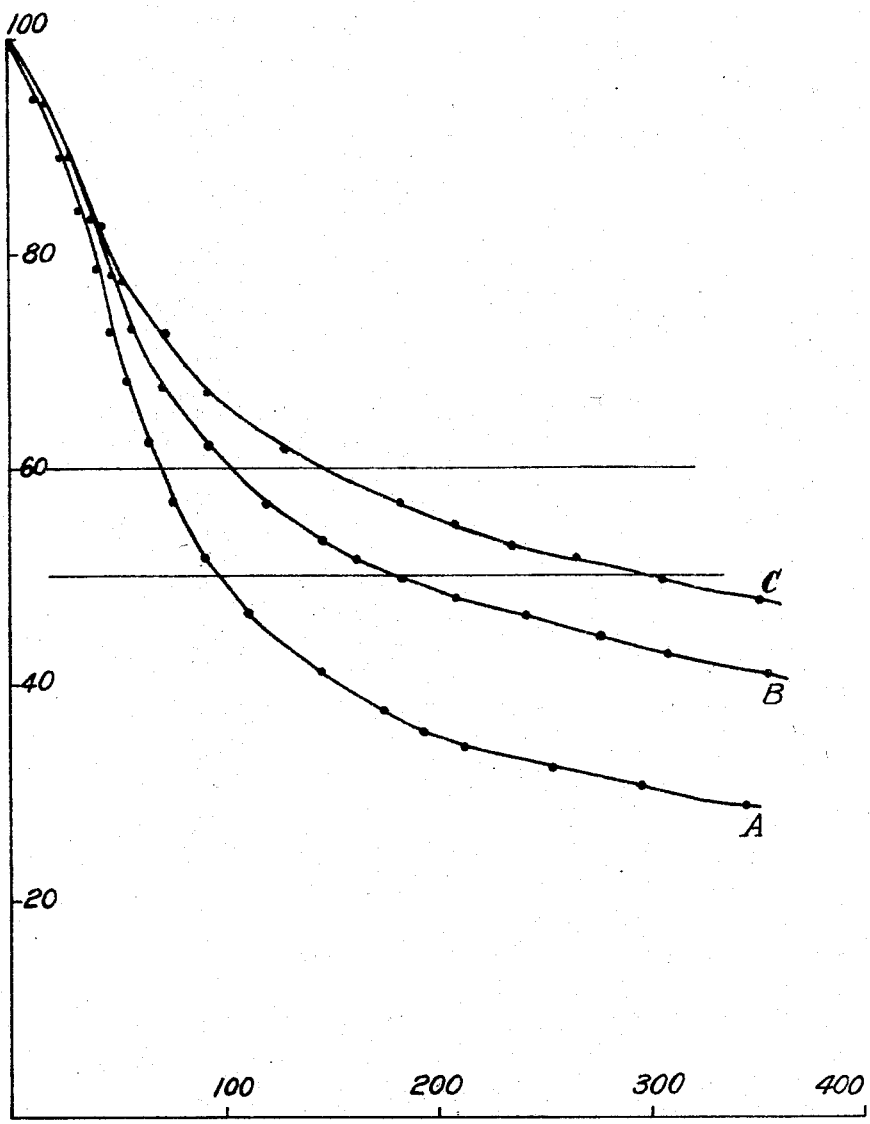

3,277,026
METHOD OF MAKING RESILIENT CELLULAR RUBBER MATERIAL CONTAINING EXPANDED POLYSTYRENE GRANULES THEREIN
John Leathem Matthew Newnham, Solihull, and Donald James Simcox, Walmley, Sutton Coldfield, England, assignors to Dunlop Rubber Company Limited, London, England
Filed Sept. 11, 1962, Ser. No. 222,803
Claims priority, application Great Britain, Sept. 27, 1961, 34,561/61
4 Claims. (Cl. 260—2.5)

This invention relates to cellular materials.

According to the present invention, a composite cellular material is made by a method which comprises dispersing bodies of a solid precursor of a cellular material in a liquid precursor of a cellular material, and converting the two precursors into the respective cellular materials proper. The liquid precursor referred to may itself be either cellular or non-cellular when the bodies of the solid precursor are dispersed in it.

The liquid precursors which may be used comprise precursors of both rigid and flexible cellular materials, and include rigid polyurethane foam forming mixtures, flexible polyurethane foam forming mixtures, gellable vulcanisable compounded natural and synthetic rubber latices (i.e. precursors of latex foam rubbers), and expandable vinyl resin dispersions. It is also possible to use various liquid polymers and polymer solutions.

The polyurethane foams referred to in the preceding paragraph are cellular materials of the kind which can be derived from an organic compound having at least two —NCO or —NCS groups in its molecule, an organic compound having at least two hydroxyl groups or other isocyante-reactive groupings in its molecule (e.g. a polyester, polyesteramide, polyether polyol, or hydroxy-acid glyceride of the kind afforded by castor oil), and other materials well known to those skilled in the art. The polyurethane foam may be obtained either in a one-stage process or by way of a "prepolymer," i.e. an intermediate reaction product derived from the two organic compounds first mentioned in which there are —NCO or —NCS groups still available for reaction. In either case, the mixture of the various materials used foams up and sets spontaneously.

The solid precursors which may be used also comprise precursors of both rigid and flexible cellular materials, although generally a solid precursor of a flexible cellular material will only be called for if the liquid precursor used is also a precursor of a flexible cellular material. The solid precursors which may be used include thermally-expandable polystyrene resin compositions, thermally-expandable regenerated cellulose compositions, thermally-expandable vinyl polymer compositions including compositions based on polyvinyl chloride and vinyl chloride copolymers, thermally-expandable polyethylene compositions, thermally-expandable polypropylene compositions, and thermally-expandable mixtures of the foregoing. Such solid precursors should soften and expand in a temperature range which can be reconciled with the temperature of treatment of the dispersion of the solid precursor in the liquid precursor, or the heat exothermally developed in the process. In the thermally-expandable compositions just mentioned, it is generally appropriate to use a volatile liquid such as a mixture of pentanes (for example) as the ingredient enabling the composition to be expanded by cell formation when heated. Expansion of the solid precursor, however, may be effected not only by means of a volatile solvent or mixture of solvents but also by the incorporation of a solid organic or inorganic material which at appropriate temperature will decompose with the evolution of gas or vapour.

As will be appreciated, the composite cellular materials obtained in accordance with the present invention comprise bodies of one cellular material dispersed through a matrix of another cellular material. These composite cellular materials, which are also included within the scope of the invention, can have the advantages of reduced cost and/or improved mechanical properties.

Thus one specific type of composite cellular material which may be made in accordance with the present invention comprises in-situ-foamed rigid polyurethane foam through which are dispersed bodies of an expanded polystyrene resin composition, and this has the advantage of reduced cost in comparison with plain in-situ-foamed rigid polyurethane foam, since the expanded polystyrene resin composition can be materially cheaper, volume for volume, than the rigid polyurethane foam, though it cannot in general be conveniently foamed in situ by itself. This first specific type of composite cellular material may be very conveniently made in accordance with the present invention by dispersing thermally-expandable polystyrene resin composition granules in a rigid polyurethane foam forming mixture, and allowing the heat evolved in the course of the polyurethane foam forming reaction to expand the polystyrene resin composition. In this specific method, and in some other specific methods in accordance with the present invention, the consumption of heat in the expansion of the solid precursor may entail a reduction in the expansion of the polyurethane foam. In this case it may be advisable to heat one or more of the reactants before the foaming stage, or to heat the composite foam during or after the foaming stage. Either pre-polymer or one-stage polyurethane foam systems may be used (see above), but if a one-stage process is used it will generally have the advantage that more heat is available during the foaming stage for the thermal expansion of the solid precursor.

A second specific type of composite cellular material which may be made in accordance with the present invention comprises flexible polyurethane foam through which are dispersed bodies of an expanded polystyrene resin composition. This second type of material may be made by a method analogous to that described above for the first type of material, and it is of particular value as a cushioning material, since it may be made less dense than a plain polyurethane foam of comparable load-compression characteristics, or be made with superior load-compression characteristics at a similar density; also it may be made at a lower cost than a comparable plain polyurethane foam, and a particularly interesting feature is that the compression of the polyurethane foam at relatively high load is usefully decreased in comparison with plain polyurethane foam, which is liable to appear too yielding at relatively high loads.

A third specific type of composite cellular material which may be made in accordance with the present invention comprises latex foam rubber through which are dispersed bodies of an expanded polystyrene resin composition. This third type of material may be made by dispersing thermally-expandable polystyrene resin composition granules in a gellable vulcanisable compounded rubber latex, foaming the latex (suitably concurrently with the addition of the granules), causing or allowing the foam to gel, and heating the gelled foam in order to effect both the vulcanisation of the foam rubber matrix and the expansion of the polystyrene resin composition granules. This third type of material is of particular value as a cushioning material and can have the advantage of reduced cost and/or usefully modified load-compression characteristics in comparison with plain latex foam rubber. However, the effect of the polystyrene granule incorporation on the load-compression characteristics may in practice be put to advantage not by increasing the compression resistance of a latex foam rubber of a given density, but rather by reducing the density of a latex foam rubber while maintaining its compression resistance by incorporation of polystyrene; this latter expedient may make possible a double saving in cost.

The relative proportions by volume of the components of the composite cellular material may vary within wide limits. In the description which follows, the volume of the expanded solid (closed-cell) portion of the composite cellular material is to be understood to be the total volume of the solid material and enclosed air, but the volume of the portion of the composite cellular material derived from the liquid precursor is to be understood to be the volume of its solid dry constituent excluding the volume of any enclosed air.

Variation in relative volume proportion of the components will naturally cause variation in the properties of the composite foam, and, more specifically, in flexible foams the greater the content of a solid cellular material such as an expanded polystyrene composition the greater will be the load carrying capacity of the composite cellular material.

In general, the volume proportions which are most useful are from 0.1 to 0.5 volume of the portion derived from the solid precursor to 1.0 volume of the portion derived from the liquid precursor. However, the proportions may be lower than this, and may again be as high as 1:1 or even as high as 2:1 or 3:1 or 4:1. The highest proportions are more useful in the rigid composite cellular materials.

In the production of composite cellular materials which are resilient by a method in accordance with the invention, particularly materials derived from expandable polystyrene and a resilient polyurethane foam forming mixture, fragments of resilient cellular material may be dispersed in the liquid precursor in addition to the bodies of the solid precursor. These fragments may for example be ground scrap foam rubber or resilient polyurethane foam. Composite materials incorporating these fragments can be made not only in the form of plain blocks but also as specially shaped mouldings.

The following examples illustrate the invention:

*Example 1*

A. A 70:30 butadiene:styrene cold-polymerised, freeze-agglomerated synthetic rubber latex of 62.5% total solids content and of about 59% dry polymer content was compounded so that it contained the following ingredients, based on 100 parts of dry polymer.

Dry weight, parts
Sulphur (as a 50% dispersion) _____ 2.0
Anti-oxidant (as a 50% dispersion) _____ 0.35
Zinc mercaptobenzothiazole (as a 50% dispersion) _ 1.5
Zinc diethyldithiocarbamate (as a 50% dispersion) _ 0.5

The compounded latex was allowed to stand for about 20 hours at room temperature (20–25° C.), and before the commencement of foaming 0.2 part of ammonia and 0.5 part of potassium oleate soap were added. The latex was foamed to give a six-fold expansion and during foaming 3.0 parts of zinc oxide as a 50% dispersion, 0.5 parts dodecyl pyridinium chloride as a 25% solution and 4.0 parts sodium silicofluoride as a 25% dispersion were added. When the required expansion had been obtained the latex foam was poured into moulds, the moulds were fitted with lids, and the foam was allowed to set. After setting the moulds were put into an oven and the latex foam cured in steam at atmospheric pressure for 30 minutes. The foam rubber, which was of good and satisfactory structure, was stripped from the moulds, washed by compressing under water to 50% of its original thickness a number of times, and dried.

B. Prepared exactly as for A except that during the foaming process 10 parts of an expandable polystyrene composition was added.

C. Prepared exactly as for A except that during the foaming process 20 parts of an expandable polystyrene composition were added.

The density of products A, B and C was measured. The samples were then compressed to 60% of their original thickness and the load per unit area required to do this determined. These values are compared in the following table.

| Procedure | Density (g./cm.$^3$) | Load/unit area (g./cm.$^2$) to compress to 60% original thickness |
|---|---|---|
| A | 0.112 | 71 |
| B | 0.110 | 103 |
| C | 0.109 | 147 |

The accompanying graph shows also how the load (shown along the horizontal axis in grams per square centimetre) varied with the thickness (shown along the vertical axis as a percentage of the original thickness) for the products of the three procedures A, B and C. The increased compression resistance at 60% original thickness may be seen and also the fact that the increase in compression resistance with products B and C was greater the higher the compression.

The increase in load carrying capacity at 60% original thickness was 45% for B and 105% for C when compared with A.

All three products were then flexed 100,000 times to 50% of their original thickness. The rate of flexing was 78 times per minute. The products were allowed to stand for 30 minutes and the load per unit area required to achieve compression to 60% of original thickness was again measured, as follows:

Product: Load/unit area, g./cm.$^2$
A _____ 66
B _____ 88
C _____ 110

When again compared with flexed product A the load carrying capacity of products from B and C was increased by 33% and 67% respectively.

*Example 2*

A compound ammonia-preserved natural rubber latex having the following composition was prepared and allowed to stand for 18 hours.

Dry weight, parts
Natural rubber latex (60% dry rubber content) ___ 100
Potassium oleate (15% solution) _____ 0.5
Sulphur (50% dispersion) _____ 2.0
Antioxidant (50% dispersion) _____ 0.35
Zinc mercaptobenzthiazole (50% dispersion) ____ 1.5
Zinc diethyldithiocarbamate (50% dispersion) ____ 0.5

A compounded 70:30 cold-polymerised freeze agglomerated butadiene-styrene synthetic rubber latex having the following composition was also prepared:

Parts
Synthetic rubber latex (59% dry polymer content) _ 100
Sulphur _____ 2.0
Antioxidant _____ 0.35
Zinc mecraptobenzothiazole _____ 1.5
Zinc diethyldithiocarbamate _____ 0.5

The matured compounded natural rubber latex and the compounded synthetic rubber latex were next mixed in proportions corresponding with equal weights of dry natural rubber and dry synthetic polymer. The mixture was then foamed, and during foaming mixed with 5.0 parts of an expandable polystyrene composition in granule form, 3.0 parts by weight of zinc oxide, 1.0 part by weight of trimen base, which is a condensation product of ethyl chloride, ammonia and formaldehyde, and 4.0 parts by weight of sodium silico fluoride, per 100 parts by weight of dry rubber present. The compounded foamed latex was poured into moulds and allowed to gel. Seven minutes after gelling the moulds were placed in open steam ovens and left for 30 minutes for vulcanisation of the foam rubber and expansion of the polystyrene composition. The cured mouldings were extracted, washed in cold water by squeezing under water to 50% of their original thickness a number of times, and dried for 16 hours in an air oven at 65°C.

For the purpose of comparison, two batches of plain foam rubber mouldings were prepared by a method corresponding with that described above except in that the 5 parts of expandable polystyrene composition granules were omitted. The density of the composite material and that of each plain foam rubber batch was determined, as also was the load required to compress each of the three materials to 60% of the original thickness; the following figures were obtained.

| Material | Density | Load/unit area for compression to 60%, gms./cm.$^2$ |
| --- | --- | --- |
| Composite | 0.099 | 68 |
| Plain | 0.1085 | 58.5 |
| Plain | 0.0895 | 39.1 |

Interpolation between the figures of 58.5 and 39.1 gms./cm.$^2$ indicated that a plain foam rubber of density 0.099 derived from the same starting materials could be expected to support a load of 48.5 gms./cm.$^2$ when compressed to 60% of the original thickness. The presence of the expanded polystyrene granules may thus be said to have increased the load-carrying capacity of the latex foam rubber when compressed to 60% of the original thickness by 19.5/48.5, i.e. approximately 40.2%.

*Example 3*

A polyurethane foam was prepared as follows. A mixture of 100 parts by weight of a 3000 molecular weight polypropylene glycol triol, 3.76 parts of water, 0.10 part of triethylene diamine, 0.40 part of stannous octoate, 0.20 part of N-methyl morpholine, and 1.00 part of a silicone glycol polymer (marketed by Dow Corning Corporation under the name "Dow Corning 199") was stirred for 10 seconds by means of an 800 r.p.m. stirrer. Then 44 parts by weight of a mixture of 80 parts of 2,4-tolylene diisocyanate and 20 parts of 2,6-tolylene diisocyanate was added, and stirring continued for a further 7 seconds. The mixture was then poured into a paper bag mould where it foamed up and gelled giving a resilient, open-pored foam. A rectangular block of this foam required a load of 14 grams/sq. cm. to compress it to 60% of its initial thickness.

A further batch of foam was now prepared exactly as above except that 30 parts of an expandable polystyrene composition was included in the polypropylene glycol triol mixture before adding isocyanate. This time the resulting foam had a compression hardness of 42 grams/sq. cm.

*Example 4*

50 grams of a polypropylene oxide triol were mixed with 342 grams of tolylene diisocyanate (consisting of 80% by weight of the 2:4 isomer with 20% by weight of the 2:6 isomer) and the mixture heated to 70° C. under nitrogen with stirring. A further 50 grams of the polyether triol were then added and the temperature was raised to 90° C. with continued stirring. 30 minutes after reaching 90° C. the resulting "prepolymer" was cooled to room temperature. Analysis showed its —NCO content to be 29.7%.

66 grams of the prepolymer were then mixed, with the aid of a high-speed stirrer, with 10 grams of expandable polystyrene beads, 35 grams of the polyether triol, 0.75 gram of N-methyl morpholine, 0.7 gram of a silicone-oil foam stabilizer, and 2.0 grams of water, all the ingredients being added as quickly as possible in the above order. Mixing took approximately 10 seconds.

The mixture was poured into an open mould where foaming took place, and the foam hardened in approximately 5 minutes. The slab of rigid polyurethane foam was of uniform and acceptable structure, density, and strength.

*Example 5*

0.05 gram of benzoyl chloride were mixed into 250 grams of dry polyepichlorhydrin at 80° C. under nitrogen. 110 grams of tolylene diisocyanate (consisting of 80% by weight of the 2:4 isomer and 20% by weight of 2:6 isomer) were then stirred in at 80° C. over a period of 30 minutes. After stirring for a further 90 minutes at 80° C. the resulting prepolymer was cooled to room temperature. Analysis showed its —NCO content to be 11.2%.

73 grams of the prepolymer were then warmed to 70° C. and mixed with 7.3 grams of expandable polystyrene beads by stirring with a high-speed stirrer. 2.9 grams of N-methyl morpholine, 0.8 gram of triethylamine, 1.4 grams of a silicone oil foam-stabilizer of 50 centipoises viscosity, 0.6 gram of water and 26.5 grams of trimethylol propane were then added as quickly as possible, all the ingredients being at a temperature of approximately 70° C. Mixing took about 10 seconds.

The mixture was quickly poured into an open mould where foaming took place. After 5 minutes, a rigid polyurethane foam slab of uniform acceptable structure resulted.

Having now described our invention, what we claim is:

1. A method of making a composite, resilient, cellular upholstery material which comprises dispersing in a vulcanizable and gellable compounded rubber latex, granules of a polystyrene composition which are expansible to a cellular structure at the temperature of vulcanization of said compounded rubber latex, foaming said latex and heating said latex and dispersed granules to a temperature to vulcanize said latex and expand said dispersed granules to a cellular structure.

2. A method according to claim 1 wherein said polystyrene composition includes a volatile liquid and said granules of polystyrene are expansible to a cellular structure.

3. A method according to claim 1 wherein said polystyrene granules are dispersed in said latex during the foaming step.

4. A method according to claim 3 wherein said latex is a mixed latex of natural rubber and synthetic rubber.

References Cited by the Examiner

UNITED STATES PATENTS

| 2,539,931 | 1/1951 | Rogers et al. | 260—2.5 |
| 2,892,216 | 6/1959 | Steel | 260—2.5 |
| 2,958,905 | 11/1960 | Newberg et al. | 260—2.5 |
| 2,959,508 | 11/1960 | Graham et al. | 260—2.5 |
| 3,094,494 | 6/1963 | Hopkins et al. | 260—2.5 |

FOREIGN PATENTS 817,981  8/1959  Great Britain.

LEON J. BERCOVITZ, *Primary Examiner.*

D. E. CZAJA, *Assistant Examiner.*